Feb. 8, 1966  A. W. ALLEN  3,233,577

GETTERING MEANS IN A VACUUM DEPOSITION DEVICE

Filed May 29, 1961

INVENTOR
ALDEN W. ALLEN

BY Orvin M. Haugen
ATTORNEY

United States Patent Office 3,233,577
Patented Feb. 8, 1966

3,233,577
GETTERING MEANS IN A VACUUM
DEPOSITION DEVICE
Alden W. Allen, St. Paul, Minn., assignor to Sperry Rand Corporation, New York, N.Y., a corporation of Delaware
Filed May 29, 1961, Ser. No. 113,545
5 Claims. (Cl. 118—49.1)

This invention relates to depositing magnetic films in vacuum, and particularly to apparatus and techniques for the vacuum deposition of bistable magnetic films to effect greater uniformity of the magnetic characteristics of the films deposited.

Magnetically bistable metal films are well known in the art. One technique for depositing such films in vacuum is taught in the Rubens Patent 2,900,282. Such films are usually referred to as "thin," and this generally means that their thickness is 10,000 A. units or less. One or more film layers may be deposited in a given evaporation cycle, these films preferably being separated by a metallic or non-metallic barrier. One of the problems peculiar to this art is overcoming the lack of desired uniformity of the magnetic properties of films sequentially or simultaneously deposited onto a single substrate during a single evaporation cycle. Another problem is overcoming the lack of such desired uniformity between films deposited at different times.

It is one of the objects of this invention to obviate certain of the uniformity problems indicated above.

This and other objects are accomplished in accordance with this invention by gettering the evaporant path to reduce residual gases from the evaporant and its path. In a specific example, a non-magnetic stainless steel chimney surrounds the evaporant path from the melt source up to a shutter which is removably disposed over the chimney. Generally, the magnetic material to be melted is heated to a desired evaporation temperature and maintained thereat for a predetermined time for stabilization purposes before the shutter is opened. During this time, the gettering action of the metal evaporant depositing onto the inside of the chimney and the underside of the shutter sweeps the chimney area substantially free of residual gases such as hydrogen, oxygen, nitrogen or the like. When a desired time has elapsed, the shutter is opened and the metal evaporant disposes on a substrate to form the desired film or films. In practice, it is generally desirable to fabricate the chimney in the form of a sleeve or other type of mechanical barrier which is disposed as closely as is mechanically practical to the exterior of the cone which defines the evaporating path. This path is, of course, the cone generated by the projection from the outer periphery of the evaporant surface to the outer periphery of the substrate surface upon which the evaporant is being condensed. It will be appreciated that the ratio of the gettering surface to the gettering volume is at a practical optimum when the radius of the chimney enclosure is made as small as is practicable for the installation. Therefore, best results are achieved when the chimney is disposed immediately adjacent to the exterior of the evaporant path defined between the evaporant crucible and the substrate surface. The improved results are achieved without need for rendering the apparatus substantially more complex and without substantially increasing the cost. The gettering effect, which is provided by the chimney is achieved without need for external connections, external leads, electrical current flow within the evaporating chamber, or the like.

Other objects and advantages of this invention will become apparent from the following description and claims in conjunction with the drawing, wherein:

Figure 1:
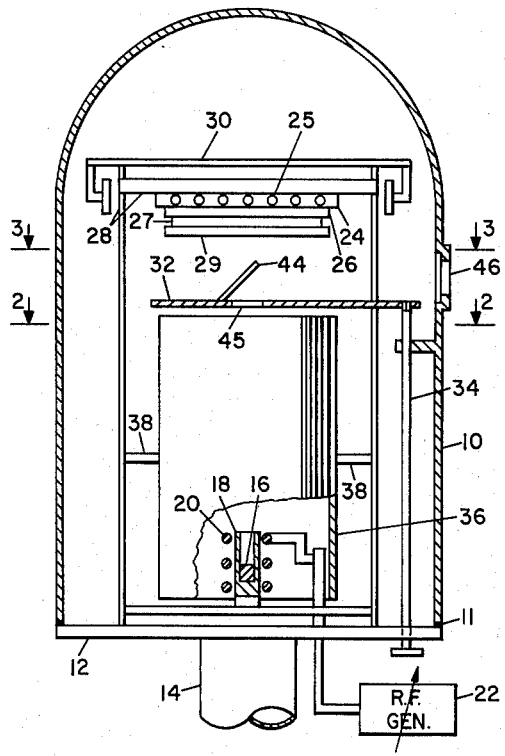
FIG. 1 is a vertical sectional view of the bell-jar enclosure, the apparatus enclosed therein being shown partially broken away.
Figure 2:
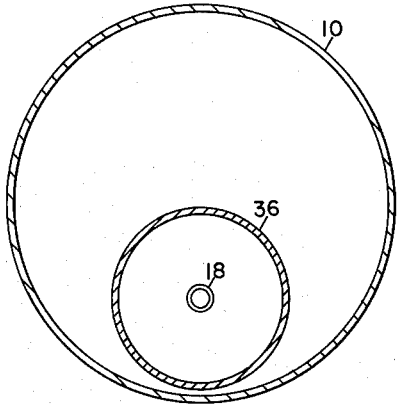
FIG. 2 is a horizontal sectional view taken along the line and in the direction of the arrows 2—2 of FIG. 1, certain apparatus being removed.
Figure 3:
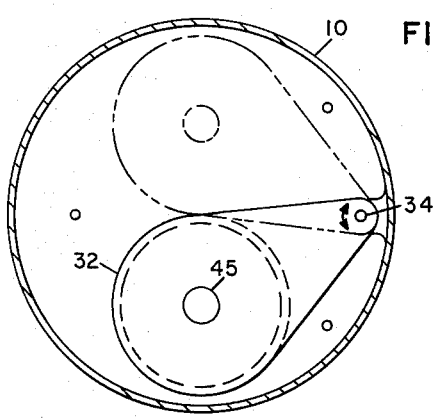
FIG. 3 is a horizontal sectional view taken along the line and in the direction of the arrows 3—3 of FIG. 1 and illustrating, in phantom, the pivotable shutter means in open or evaporating position.
Figure 4:
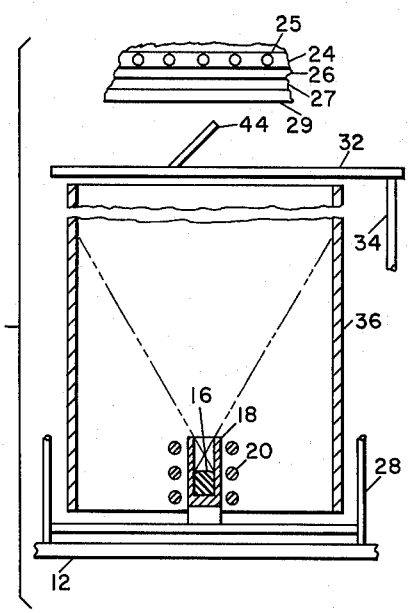
FIG. 4 is a horizontal sectional view taken along the central axis of the aparatus of FIG. 1 and illustrating the evaporant path as defined between the evaporant source and the substrate surface.

In the drawing, bell jar 10 is illustrated as being metallic, though it may be made of glass if desired. Base plate 12 forms, along with jar 10, an enclosure or chamber which may be evacuated by any suitable vacuum pump (not shown) coupled to the apparatus as via pipe 14.

Generally, the illustrated apparatus is similar to that described in the Rubens Patent 2,900,282. The metallic ferromagnetic material (melt) 16 to be melted and evaporated is held in a crucible 18 around which is an R.-F. work coil 20 for inductively heating the magnetic material 16. R.-F. current for the induction heating may be supplied by an external generator 22, power output of which may be continuously regulated either automatically or manually, for example from 5 to 90% of maximum power, by an operator.

Disposed in the upper end of the bell jar is a substrate heater 20 underneath which is a holder 26 for holding a substrate 27 in a predetermined position for receiving evaporant as it reaches the substrate. For improving adhesion, the substrate is normally heated to and maintained at an elevated temperature. For nickel-iron alloys in the range of about 80% nickel, balance iron, the substrate being glass, a temperature in the range of about 250° C. to 350° C. generally around 300° C. is preferred. A mask 29 for defining one or more films may also be held in contact with, or at a predetermined distance from, the substrate 27 by holder 26. The holder itself may be held in any convenient manner, for example, as by the supports 28 illustrated. These supports may also hold an electromagnet or, as shown, a permanent magnet 30, the ends of which apply a field across the substrate to give the film or films deposited thereon an "easy" axis of magnetization all as described in the said Rubens patent. An alternating or nonuniform field may be employed if desired. In the disclosed arrangement, the field along with the heating of the substrate effects a uniaxially anisotropic, effectively single domain film. Instead of using a field, uniaxial anisotropy in the film may be achieved by other means, such as by directing the evaporant onto the substrate at an oblique angle, as is well known in the art.

For optimum results, a system is established wherein the crucible and the substrate are relatively small, and wherein the distance between the two is relatively large. This contributes to a more uniform deposition across the surface of the substrate. Except for the cases where the substrate is arranged at an oblique angle to the evaporant path, the substrate is preferably arranged normal to this path. Size limitations in crucibles, power supplies and the like, impose a strict limitation upon the maximum size of the melt possible. Inasmuch as the substrate size or area generally exceeds that size or area of the melt surface, a cone of increasing area projected from the melt surface to the substrate surface is generally utilized to define the evaporant path. For best results, it has been found that the included angle θ between the axis of the evaporant cone and the walls thereof should not reasonably be in excess of about 12.5°. Accordingly, since it may be necessary to employ a bell jar enclosure which has a diameter substantially in excess of the diameter of the evaporant path for peripheral equipment and the like, the gettering action available along the evaporant path is at an optimum only if the gettering surface is disposed substantially adjacent to this path.

Between the magnetic material holder 18 and the substrate 27 is a shutter 32 pivotable on rod 34, so as to open and close the evaporation path. In accordance with this invention, there is included in the lower portion of the bell jar, i.e., below shutter 32, a chimney 36, the purpose of which is described below. This chimney may be held in position by brackets 38. The chimney and the shutter 32 are preferably fabricated from non-magnetic metallic material, preferably stainless steel or the like. As representative of dimension, no limitation being intended, the distance between the upper end of crucible 18 and the substrate may be 18 inches, while chimney 36 is 10 inches in diameter and 15 inches long. Shutter 32 is of sufficient planar area to prevent evaporant from being deposited onto the substrate while the shutter is fully over chimney 36. A shutter which is pivotable about an axis removed from the evaporant path is preferred. In this connection, there are fewer moving parts utilized in the system, a feature which is extremely valuable in high vacuum systems. In addition, the simplicity of this type of shutter provides less opportunity for condensed particles to fall away from the surface of the shutter system and into the evaporant path. Thus, the bell jar must have a sufficiently large diameter to accommodate the shutter when rotated out of the evaporant path.

To determine the temperature of melt 16 while it is being heated by work coil 20, any suitable means may be employed, for example, those described in the above-mentioned Rubens patent. In the drawing herewith, an optical pyrometer system is indicated and includes a front-face mirror 44, disposed above an aperture 45 in shutter 32, and a window 46 in a wall of jar 10. Any suitable pyrometer means, not shown, may be utilized, and is preferably situated immediately adjacent the window 46.

In operation, the ferromagnetic material 16 is heated by applying power from the generator 22 to work coil 20 and raising the temperature of the ferromagnetic material to above its melting point, for example, to a temperature of approximately 200° C. above the melting point of the material. This is done while the shutter 32 covers the top of chimney 36 and after the bell jar chamber has been pumped down to a desirable pressure, for example $1 \times 10^{-7}$ mm. of mercury or less, and after the substrate has been heated to approximately 300° C. During the heating and melting of the ferromagnetic material, the pressure in the jar rises often reaching a pressure in the $10^{-6}$ mm. of mercury range as a result of outgassing and other effects. However, during this time the R.-F. input current to the work coil 20 is carefully controlled to maintain the melt temperature as registered by the optical pyrometer, near a desired evaporation temperature in the allowable range thereof, this temperature, for most materials, being about 200° C. above the melting point. The particular temperature in this range which one may use depends on the type of ferromagnetic material being melted and the characteristics desired for the deposited film. As above indicated, generally the temperature is approximately 200° C. above the melting point to effect desired evaporation. This temperature, however, may vary within a range the maximum point of which is that temperature imposed by the physical limitations of crucible 18. For curcibles presently available, 1800° C. is about the maximum since around that temperature the crucible may crack or contaminate the melt, but of course higher temperatures may be employed where the particular crucible used will allow such. For Permalloy, which contains, for example, 75% to 85% nickel, remainder iron, the lower evaporation temperature is in the range of around 1500° C.

After the desired evaporation temperature is first reached, shutter 32 is maintained closed for a given length of time, for example from two to ten minutes, while the R.-F. input is controlled to maintain the melt near this temperature to stabilize the melt temperature, and to maintain the pressure in the bell jar to less than $5 \times 10^{-7}$ mm. of mercury. The time required to outgas the melt and stabilize or equilibrate the melt temperature throughout the melt is determined by the temperature at which the melt is maintained. For temperatures in the lower part of the allowable temperature evaporation range, the stabilizing time required is less than that for temperatures in the upper part of the range. Generally, for most materials, a range of from five to seven minutes is required to stabilize the melt temperature.

While the shutter is closed, no evaporated material is deposited on the substrate, but the metal evaporant leaving the crucible is trapped in the lower chimney area and deposit on the underside of shutter 32 and the inside of chimney 36. The gettering action of such metal deposition reduces the residual gases present in the chamber, and particularly those in the lower portion of the chimney.

In the preparation of metallic ferromagnetic alloys for use as melts, a certain amount of different gases are are normally entrapped in the resultant alloy. For example, in "Vapalloys" compounded from the high purity iron, nickel and cobalt raw materials, available from the Precision Metals and Electronics Division of the Hamilton Watch Company and prepared by vacuum induction melting under careful control, residual gas content is kept at a minimum. Hydrogen and nitrogen are usually less than one part per million with oxygen being included in only slightly greater quantity. Consequently, when such source material is used as melts for thin film deposition and "boiled" as during the aforementioned stabilizing period, these residual gases form part of the evaporant. Also, the vacuum chamber itself contains residual gases from other sources within the enclosure. It is known that in accordance with the present invention, at least residual hydrogen due either to its presence in the evaporant, vacuum chamber, or both, is reduced in, if not swept free from, the lower chimney during metal evaporation while the shutter is held closed. While the shutter is open during film deposition or evaporation, gettering action of at least residual hydrogen occurs in both the upper and lower chimney areas. Presumably the gettering action, whether the shutter is open or closed, extends to other residual gases during evaporation.

Other types of ferromagnetic material may be employed with the invention, to make bistable ferromagnetic films for memory or logical work. Generally, the melt is a metal alloy which includes two or more of the following: nickel, iron, cobalt, molybdenum, in various percentages well known in the art. Melts which produce 81–19 nickle-iron films and 90–10 cobalt-iron films have been found highly satisfactory.

Metal films deposited through chimney 36 have exhibited more uniform properties than those produced without such a chimney. For example, in this magnetic metal films, the coercivity and anisotropy field exhibits a degree of uniformity not experienced when thin films are deposited in the absence of a chimney. This uniformity of magnetic properties is not only exhibited between the magnetic films resulting from one run or cycle (when several are deposited at a time) but it also occurs from one run to the next. It is assumed that this uniformity is a result of the greater mean free path within the chimney caused by the gettering effect of the chimney. The upper portion of the chimney apparently adds little, if any, to the overall gettering effect, since it may be removed without significant change in the magnetic property of the resultant films. While two chimney portions may be used, it is preferable that shutter 32 be located close to the substrate; thus chimney 36 is made in a single section and has been found to produce a greater gettering action.

Another advantage in using a chimney is that the apparatus can be cleaned easier, i.e., the metal deposited on the chimneys may be removed by simply removing and cleaning the chimneys themselves thus resulting in less down time for the apparatus. Shutter 32 may also be removed and cleaned with ease. Both the shutters and chimney can be cleaned as required by a wire brush and acid etching techniques.

Thus, there has been fully disclosed an invention which provides all the objects and advantages stated herefore, and more. Those skilled in the art will appreciate, after reading this disclosure, that variations can be effected within the scope of the invention the limitations of which are defined by the following claims.

What is claimed is:

1. Apparatus for producing at least one magnetic film comprising means forming an evacuatable enclosure, means for supporting a substrate disposed in said enclosure, holding means in said enclosure and spaced from said substrate for holding and evaporating ferromagnetic material as evaporant onto said substrate to form said film, shutter means removably disposed between said substrate and holding means to control deposit of said evaporant onto said substrate, and means for gettering a substantial portion of the evaporant path defined between said holding means and shutter means, said gettering means including a chimney surrounding said evaporant path and being disposed substantially adjacent thereto, said chimney extending along a substantial portion of the distance between said holding means and shutter.

2. Apparatus as in claim 1 wherein said chimney is made of nonmagnetic stainless steel.

3. Apparatus as in claim 1 wherein said chimney is made of nonmagnetic material.

4. Apparatus for producing at least one bistable magnetic film comprising means forming an evacuatable chamber, means for supporting a substrate member disposed in said chamber, means disposed in said chamber and spaced from said substrate for holding ferromagnetic metal, means for evaporating said metal from said holding means onto said substrate as a film deposit, means for making the deposit uniaxially anisotropic, shutter means removably disposed between said substrate and holding means to control deposit of the evaporant onto said substrate, and gettering means in said chamber for removing at least a portion of any residual gases which are in the evaporant path during evaporation of said metal, said gettering means including a chimney surrounding said evaporant path and being disposed substantially adjacent thereto, said chimney extending along a substantial portion of the distance between said holding means and shutter.

5. Apparatus for producing at least one magnetic film comprising:

means for forming an evacuatable enclosure;

supporting means for supporting a substrate in a predetermined position in said enclosure;

holding and evaporating means in said enclosure and spaced from a supported substrate for holding and evaporating ferromagnetic material along a predetermined path as evaporant onto said substrate to form deposited films;

shutter means removably disposed between the said substrate and said holding and evaporating means for controlling the deposit of the evaporant onto the said substrate;

chimney means disposed along and occupying a substantial portion of the area closely adjacent to the evaporant path, said chimney means encircling said holding and evaporating means for cooperatively acting with the shutter means for gettering a substantial portion of the evaporant path defined between said shutter means and said holding and evaporating means and enclosed within the chimney means.

References Cited by the Examiner

UNITED STATES PATENTS

| 2,727,167 | 12/1955 | Alpert | 117—107 |
| 2,752,882 | 7/1956 | Heimann | 118—49 |
| 2,900,282 | 8/1959 | Rubens | 117—227 |
| 2,948,635 | 8/1960 | Koller | 118—49.1 X |
| 2,951,774 | 9/1960 | Peck | 117—227 |
| 3,017,851 | 1/1962 | Krause | 118—49 |
| 3,036,933 | 5/1962 | Caswell | 117—107 |
| 3,065,105 | 11/1962 | Pohm | 117—107 |
| 3,085,913 | 4/1963 | Caswell | 117—107 |

FOREIGN PATENTS 579,637  7/1959  Canada.

MORRIS KAPLAN, *Primary Examiner.*

SAMUEL FEINBERG, BENJAMIN A. BORCHELT,
*Examiners.*